(12) United States Patent
Park

(10) Patent No.: US 10,605,611 B2
(45) Date of Patent: Mar. 31, 2020

(54) NAVIGATION DEVICE AND TRAFFIC INFORMATION MATCHING METHOD THEREOF

(71) Applicants: Hyundai Motor Company, Seoul (KR); Kia Motors Corporation, Seoul (KR)

(72) Inventor: Kangwon Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 251 days.

(21) Appl. No.: 15/290,778

(22) Filed: Oct. 11, 2016

(65) Prior Publication Data

US 2017/0314937 A1    Nov. 2, 2017

(30) Foreign Application Priority Data

Apr. 29, 2016    (KR) .................. 10-2016-0053106

(51) Int. Cl.
  *G01C 21/32* (2006.01)
  *G01C 21/36* (2006.01)
  *G01C 21/34* (2006.01)

(52) U.S. Cl.
  CPC ......... *G01C 21/32* (2013.01); *G01C 21/3415* (2013.01); *G01C 21/3694* (2013.01)

(58) Field of Classification Search
  None
  See application file for complete search history.

(56) References Cited

U.S. PATENT DOCUMENTS 5,831,552 A * 11/1998 Sogawa ............. G01C 21/3694
                                                                340/905
2011/0098912 A1    4/2011 Baselau et al.

FOREIGN PATENT DOCUMENTS

| JP | 2003-057056 A | 2/2003 |
|---|---|---|
| JP | 3846486 B2 | 11/2006 |
| JP | 2008-298573 A | 12/2008 |
| JP | 2009-075933 A | 4/2009 |
| JP | 2011-047886 A | 3/2011 |
| JP | 2012-018132 A | 2/2012 |
| JP | 2012-118028 A | 6/2012 |
| JP | 2013-529291 A | 7/2013 |

(Continued)

OTHER PUBLICATIONS

"OpenLR—Open, Compact and Royalty-free Dynamic Location Referencing." retreived from www.tomtom.com/page/openLR, accessed on Oct. 11, 2016.

*Primary Examiner* — Christian Chace
*Assistant Examiner* — Kyung J Kim
(74) *Attorney, Agent, or Firm* — Mintz Levin Cohn Ferris Glovsky and Popeo, P.C.; Peter F. Corless

(57) ABSTRACT

A navigation device includes: a memory storing map data of a map used for route searching; a traffic information receiving unit receiving traffic information from an external server; a matching unit matching a traffic event included in the received traffic information to the map used for route searching based on the traffic information; and a correction unit performing correction by removing a portion matched to an expressway of the map from a section to which the traffic event is matched on the map by the matching unit. The traffic event includes a closed event on a slip road, and the traffic event is matched to the expressway.

9 Claims, 4 Drawing Sheets

(56) References Cited

FOREIGN PATENT DOCUMENTS

| KR | 2005-0103016 A | 10/2005 |
| KR | 10-2008-0114184 A | 12/2008 |
| KR | 10-2009-0010378 A | 1/2009 |
| KR | 10-2015-0078795 A | 7/2015 |

\* cited by examiner

NAVIGATION DEVICE AND TRAFFIC INFORMATION MATCHING METHOD THEREOF

CROSS-REFERENCE TO RELATED APPLICATION

This application claims priority to and the benefit of Korean Patent Application No. 10-2016-0053106 filed in the Korean Intellectual Property Office on Apr. 29, 2016, the entire contents of which are incorporated herein by reference as if fully set forth herein.

BACKGROUND OF THE DISCLOSURE

(a) Technical Field

The present disclosure relates generally to a navigation device and, more particularly, to a navigation device and a traffic information matching method thereof.

(b) Description of the Related Art

Currently, many vehicles provide navigation services based on traffic and navigation information. However, in a case where a traffic information provider and a navigation information provider use different maps, an error may occur in matching traffic information between maps. An open, compact, and royalty-free dynamic location referencing (OPENLR) technique has been proposed as a solution to the error in matching heterogeneous maps. However, the current OPENLR technique cannot match heterogeneous maps 100% of the time, causing a problem in that positions between heterogeneous maps are not accurately matched.

Notably, a closed event is a traffic information event indicating that a road is closed and/or blocked, significantly affecting route search. When a navigation device matches a closed event to a map thereof, it may provide erroneous route information to degrade quality of route search. For instance, when a closed event occurs in a ramp section such as an interchange (IC) or a junction (JC) of an expressway, the influence of the matching error between heterogeneous maps may be further enhanced. Thus, information between heterogeneous maps needs to be conservatively or accurately matched in a road of a higher level such as an expressway.

The above information disclosed in this Background section is only for enhancement of understanding of the background of the disclosure, and therefore, it may contain information that does not form the related art that is already known to a person of ordinary skill in the art.

SUMMARY OF THE DISCLOSURE

The present disclosure has been made in an effort to provide a navigation device and traffic information matching method thereof having advantages of enhancing accuracy of matching between a map used for providing traffic information and a map used for route search.

According to embodiments of the present disclosure, a navigation device includes: a memory storing map data of a map used for route searching; a traffic information receiving unit receiving traffic information from an external server; a matching unit matching a traffic event included in the received traffic information to the map used for route searching based on the traffic information; and a correction unit performing correction by removing a portion matched to an expressway of the map from a section to which the traffic event is matched on the map by the matching unit. The traffic event includes a closed event on a slip road, and the traffic event is matched to the expressway.

Furthermore, according to embodiments of the present disclosure, a traffic information matching method of a navigation device includes: storing map data of a map used for route searching on a memory; receiving traffic information from an external server; matching a traffic event included in the received traffic information to the map used for route searching based on the traffic information; determining whether the traffic event includes a closed event on a slip road; determining whether the traffic event is matched to an expressway of the map when the traffic event includes the closed event on the slip road; and performing correction by removing a portion matched to the expressway from a section to which the traffic event is matched on the map.

Furthermore, according to embodiments of the present disclosure, non-transitory computer readable medium contains program instructions for performing a traffic information matching method of a navigation device, the program instructions when executed by a processor cause the processor to: receive traffic information from an external server; match a traffic event included in the received traffic information to a map used for route searching based on the traffic information, wherein map data of the map used for route searching is stored on a memory; determine whether the traffic event includes a closed event on a slip road; determine whether the traffic event is matched to an expressway of the map when the traffic event includes the closed event on the slip road; and perform correction by removing a portion matched to the expressway from a section to which the traffic event is matched on the map.

Accordingly, accuracy of matching between a map used to provide traffic information and a map used for route search may be enhanced using the techniques described herein.

Figure 1:
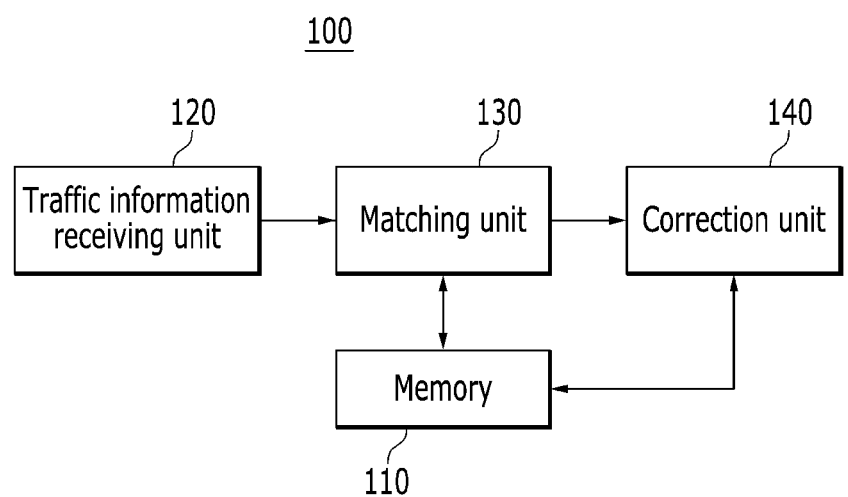
FIG. 1 is a block diagram schematically illustrating a navigation device according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION OF THE EMBODIMENTS

Hereinafter, embodiments of the present disclosure will be described in detail with reference to the accompanying drawings so that a person skilled in the art to which the present disclosure pertains to easily implement the disclosure. As those skilled in the art would realize, the described embodiments may be modified in various different ways, all without departing from the spirit or scope of the present disclosure.

The terminology used herein is for the purpose of describing particular embodiments only and is not intended to be limiting of the disclosure. Throughout this specification and the claims that follow, when it is described that an element is "coupled" to another element, the element may be "directly coupled" to the other element or "electrically coupled" to the other element through a third element. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a navigation device and a traffic information matching method thereof according to embodiments will be described with reference to the accompanying drawings.

Figure 2:
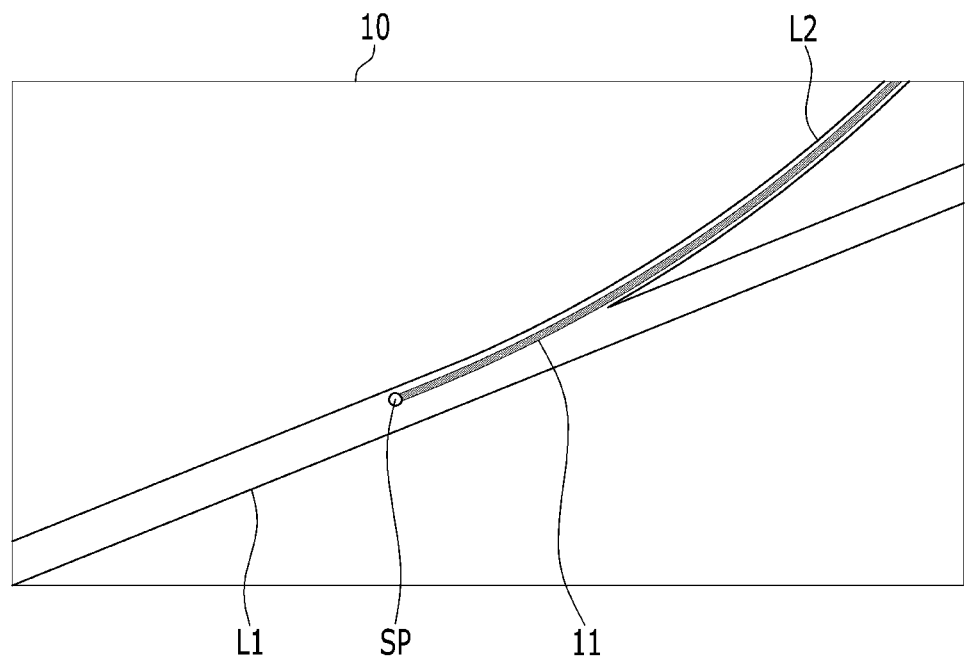
FIG. 2 is a view illustrating an example in which a matching error occurs in a traffic event.
Figure 3:
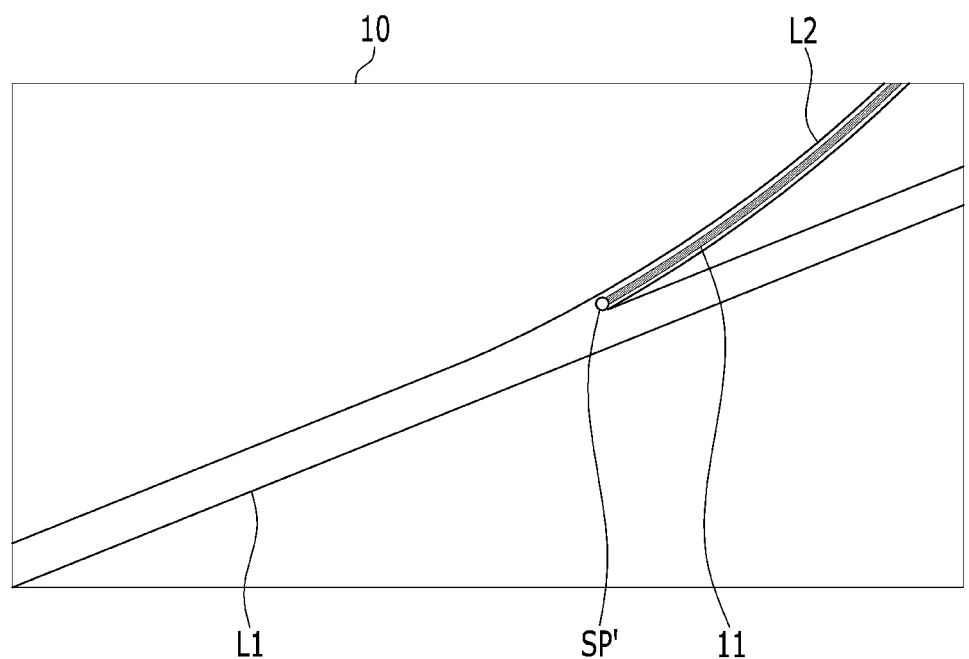
FIG. 3 is a view illustrating an example of correcting the matching error of FIG. 2 in a navigation device according to embodiments of the present disclosure.

FIG. 1 is a block diagram schematically illustrating a navigation device according to embodiments of the present disclosure. FIG. 2 is a view illustrating an example in which a matching error occurs in a traffic event. FIG. 3 is a view illustrating an example of correcting the matching error of FIG. 2 in a navigation device according to embodiments of the present disclosure.

As shown in FIG. 1, a navigation device 100 may include a memory 110, a traffic information receiving unit 120, a matching unit 130, and a correction unit 140. The components illustrated in FIG. 1 are not essential and the navigation device 100 may be implemented to include greater or fewer components.

The memory 110 stores map data of a map used for searching for a route (hereinafter, referred to as a "route search map") in the navigation device 100. In the route search map, each road is differentiated as at least one link, and map data of the information search map may include link information regarding each link. Link information included in the map data may include a road attribute, a link ID, a link attribute, link section information, a link class, and the like.

The traffic information receiving unit 120 receives traffic information from a traffic information providing server (not shown). The traffic information may include information regarding a traffic event. The traffic event may be various events that occur in a road such as congestion, road impossible (or road closed), an accident, a road work, and the like. The information regarding a traffic event may include information such as a traffic event type, an event occurrence section (e.g., a link ID, a link attribute, a link class, a start point or a start node, an end point or an end node, etc.), and the like.

The matching unit 130 decodes the traffic information received through the traffic information receiving unit 120 to obtain information regarding the traffic event. The matching unit 130 performs a matching process to match the traffic event to the route search map on the basis of the obtained information. That is, the matching unit 130 sets a start point and an end point of the traffic event on the route search map on the basis of coordinate information of the start point and the end point of the traffic event included in the traffic information.

When matching the traffic event and the route search map is completed, the matching unit 130 stores matching information regarding the road event in the memory 110. The matching information may include link information (e.g., a road attribute, a link ID, a link attribute, a link class, and the like) of a link to which the traffic event is matched on the route search map, coordinate information of each point mapped as a start point and an end point of the traffic event on the route search map, and the like.

When it is determined that a matching error occurs, the correction unit 140 may correct the start point or the end point of the traffic event on the route search map to correct the matching information of the traffic event.

If the map used to generate traffic information by the traffic information generating server and the route search map used in the navigation device 100 are different, a matching error may occur due to the difference between the two maps in the process in which the navigation device 100 matches the traffic information and the route search map. The matching error may act as a factor degrading route search quality of the navigation device 100. In particular, in a case in which a closed event that occurs in a ramp section such as an interchange (IC) or a junction (JC) of an expressway is erroneously matched to the route search map, the influence due to the erroneous matching may be further increased.

Thus, the correction unit 140 may detect the case in which the closed event that occurs in the ramp section connected to an expressway is erroneously matched to the expressway, and correct the matching information.

To this end, the correction unit 140 analyzes traffic information and determines whether a traffic event included in the traffic information is a closed event that has occurred in a slip road. That is, the correction unit 140 determines whether a type of the traffic event is a closed event and whether a link attribute corresponding to the traffic event corresponds to a slip road.

When the traffic event included in the traffic information is a closed event that has occurred in the slip road, the correction unit 140 checks matching information to determine whether matching error has occurred. When a road attribute of at least one of links to which the closed event is matched in the route search map is highway/freeway, the correction unit 140 may determine that a matching error has occurred. For example, referring to FIG. 2, when the closed event that occurs in the slip road is matched also to a link L1, an expressway, as well as a link L2 as a ramp section on the route search map 10, the correction unit 140 determines that a match error has occurred.

When the matching error occurs, the correction unit 140 searches for a section to which a traffic event is matched on the route search map, and detects a start point of a ramp section. To this end, the correction unit 140 detects points positioned on the expressway among points set as a start point and an end point of the traffic event on the route search map. The correction unit 140 searches for a point from which a link in which a link attribute is a ramp section, while moving gradually from the corresponding point to the other point. For example, referring again to FIG. 2, the correction unit 140 determines that a start point SP of the traffic event 11, among the start point SP and an end point (not shown), is positioned on the link L1 of the expressway. Accordingly, the correction unit 140 searches for a start point of a lamp section L2, while gradually moving from the start point SP toward the end point of the traffic event 11 on the route search map.

When the start point of the ramp section is detected through the above process, the correction unit 140 corrects the start point or the end point of the traffic event matched to the route search map to the start point of the ramp section. Among the start point and the end point of the traffic event, the correction unit 140 corrects a point positioned on the link of the expressway on the route search map to the start point of the ramp section. For example, referring now to FIG. 3, among the start point SP and the end point (not shown) of the traffic event 11, since the start point SP is positioned on the link L1 of the expressway, the correction unit 140 corrects the start point SP to a start point SP' of the ramp section L2.

Due to the correction, in the section to which the traffic event is matched on the route search map, a portion matched to the expressway is removed.

When the start point or the end point of the traffic event on the route search map is corrected, the correction unit 140 updates matching information stored in the memory 110 to include coordinate information of the corrected point.

In the navigation device 100 having the aforementioned structure, the functions of the traffic information receiving unit 120, the matching unit 130, and the correction unit 140 may be performed by a processor implemented as a central processing unit (CPU), any other chipset, or microprocessor.

Figure 4:
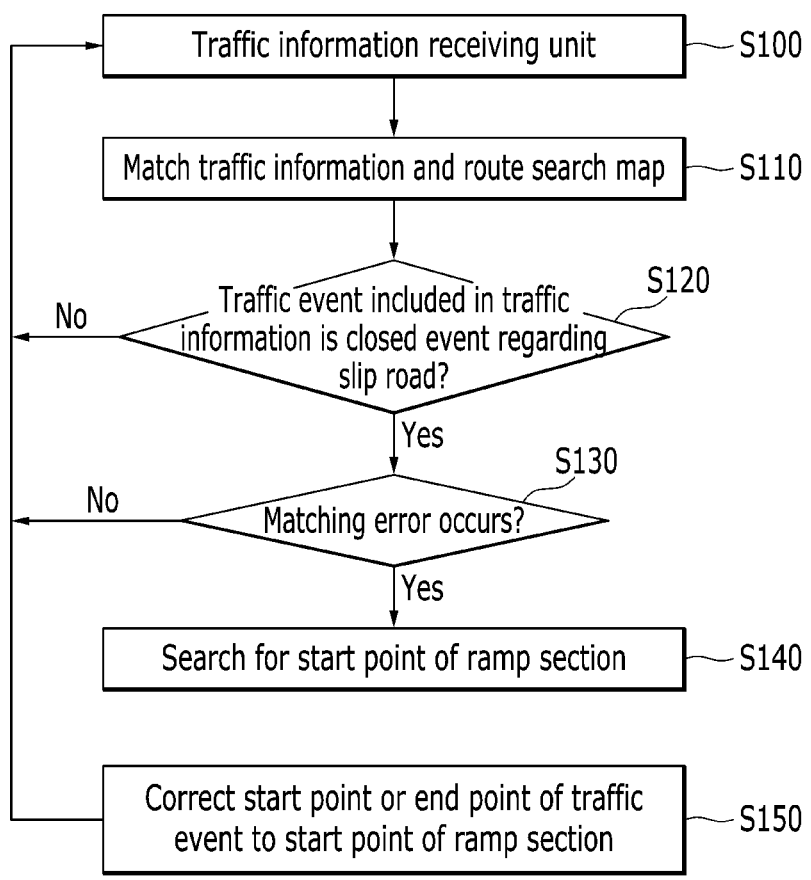
FIG. 4 is a flow chart illustrating a traffic information matching method of a navigation device according to embodiments of the present disclosure.

FIG. 4 is a flow chart illustrating a traffic information matching method of a navigation device according to embodiments of the present disclosure.

As shown in FIG. 4, the navigation device 100 according to embodiments of the present disclosure receives traffic information from a traffic information providing server (not shown) (S100).

The navigation device 100 decodes the received traffic information to obtain information regarding a traffic event. The navigation device 100 performs a matching process of matching the traffic event to a route search map on the basis of the obtained information regarding the traffic event (S110).

Thereafter, in order to detect a matching error, the navigation device 100 determines whether the traffic event included in the traffic information is a closed event which has occurred in a slip road (S120).

When the traffic event is a closed event that has occurred in the slip road, the navigation device 100 analyzes a section to which the traffic event is matched on the route search map to determine whether a matching error has occurred (S130).

When the closed event that has occurred in the slip road is matched to a link corresponding to an expressway of the route search map in step S130, the navigation device 100 may determine that a matching error has occurred.

When it is determined that a matching error has occurred, the navigation device 100 searches for a start point of a ramp section from the section to which the closed event is matched in the route search map (S140). The navigation device 100 corrects the start point or the end point of the closed event set on the route search map to the start point of the ramp section searched in step S140 (S150). Accordingly, the portion matched to the expressway in the section to which the traffic event is matched in the route search map is removed.

According to the embodiments of the present disclosure, the navigation device may correct a matching error that a closed event that occurs in a ramp section corresponding to an IC or a JC of an expressway is matched to the expressway. Therefore, matching accuracy of traffic information may be increased to enhance quality of route search.

The traffic information matching method of the navigation device according to embodiments of the present disclosure described above may be executed through software. When executed by software, the constituent elements of the embodiments of the present disclosure are code segments executing required operations. Programs or code segments may be stored in a processor readable medium.

The computer readable recording medium includes all types of recording devices storing data readable by computer systems. Examples of the computer readable recording medium include ROM, RAM, CD-ROM, DVD-ROM, DVD-RAM, magnetic tapes, floppy disks, hard disks, optical data storage devices, and the like. The computer readable recording medium may also be distributed to computer devices connected by a network so that the computer readable codes are stored and executed in a distributed fashion.

The drawings referred to and the detailed descriptions of the present disclosure are merely illustrative and have been used to describe the present disclosure but not intended to limit the scope of the present disclosure described in claims. Thus, a person skilled in the art may easily select therefrom to replace the same. Also, a person skilled in the art may omit some of the components described in the present disclosure without degrading performance or add a component to improve performance. In addition, a person skilled in the art may alter order of the steps of the method described in the present disclosure according to a process environment or equipment. Thus, the scope of the present disclosure should be determined by claims and the equivalent, rather than by the embodiments described herein.

What is claimed is:

1. A navigation device comprising:
    a memory storing map data of a map used for route searching; and
    a processor configured to execute program instructions stored in the memory, which when executed cause the processor to control operation of:
        a traffic information receiving unit receiving traffic information from an external server;
        a matching unit matching a traffic event included in the received traffic information to the map used for route searching based on the traffic information; and
        a correction unit performing correction of the traffic information, when the traffic event includes a closed event on a slip road, and the traffic event is matched to overlap an expressway of the map, by removing an overlapping portion of the traffic information from a section to which the traffic event is matched on the map and maintaining a non-overlapping portion of the traffic information from the section to which the traffic event is matched on the map, the overlapping portion being a portion that overlaps the expressway of the map, and the non-overlapping portion being a portion that does not overlap the expressway of the map,
    wherein the navigation device is configured to output a navigation service to a user based on the corrected traffic information.

2. The navigation device of claim 1, wherein the correction unit corrects a start point or an end point of the traffic event matched to the map to a start point of a ramp section.

3. The navigation device of claim 2, wherein the correction unit corrects a point located on the expressway to the start point of the ramp section, the point located on the expressway being either the start point or the end point of the traffic event.

4. The navigation device of claim 2, wherein the correction unit searches for the start point of the ramp section, while moving from one of the start point and the end point of the traffic event to the other of the start point and the end point of the traffic event.

5. A traffic information matching method of a navigation device, the method comprising:
    storing map data of a map used for route searching on a memory;
    receiving, by a processor, traffic information from an external server;
    matching, by the processor, a traffic event included in the received traffic information to the map used for route searching based on the traffic information;
    determining, by the processor, whether the traffic event includes a closed event on a slip road;
    determining, by the processor, whether the traffic event is matched to overlap an expressway of the map when the traffic event includes the closed event on the slip road;
    performing, by the processor, correction of the traffic information, when the traffic event is matched to overlap the expressway of the map, by removing an overlapping portion of the traffic information from a section to which the traffic event is matched on the map and maintaining a non-overlapping portion of the traffic information from the section to which the traffic event is matched on the map, the overlapping portion being a portion that overlaps the expressway of the map, and the non-overlapping portion being a portion that does not overlap the expressway of the map,
    wherein the navigation device is configured to output a navigation service to a user based on the corrected traffic information.

6. The traffic information matching method of claim 5, wherein the performing of the correction comprises:
    correcting, by the processor, a start point or an end point of the traffic event matched to the map to a start point of a ramp section.

7. The traffic information matching method of claim 6, wherein the correcting of the start point or the end point of the traffic event to the start point of the ramp section comprises:
    correcting, by the processor, a point located on the expressway to the start point of the ramp section, the point located on the expressway being either the start point or the end point of the traffic event.

8. The traffic information matching method of claim 6, further comprising searching, by the processor, for the start point of the ramp section, while moving from one of the start point and the end point of the traffic event to the other of the start point and the end point of the traffic event.

9. A non-transitory computer readable medium containing program instructions for performing a traffic information matching method of a navigation device, the program instructions when executed by a processor cause the processor to:
    receive traffic information from an external server;
    match a traffic event included in the received traffic information to a map used for route searching based on the traffic information, wherein map data of the map used for route searching is stored on a memory;
    determine whether the traffic event includes a closed event on a slip road;
    determine whether the traffic event is matched to overlap an expressway of the map when the traffic event includes the closed event on the slip road; and
    perform correction of the traffic information, when the traffic event is matched to overlap the expressway of the map, by removing an overlapping portion from a section to which the traffic event is matched on the map and maintaining a non-overlapping portion of the traffic information from the section to which the traffic event is matched on the map, the overlapping portion being a portion that overlaps the expressway of the map, and the non-overlapping portion being a portion that does not overlap the expressway of the map,
    wherein the navigation device is configured to output a navigation service to a user based on the corrected traffic information.

* * * * *